United States Patent
Utsunomiya et al.

(10) Patent No.: US 6,858,339 B2
(45) Date of Patent: Feb. 22, 2005

(54) SEPARATOR FOR FUEL CELL AND FUEL CELL

(75) Inventors: Masao Utsunomiya, Wako (JP); Teruyuki Ohtani, Wako (JP); Makoto Tsuji, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 416 days.

(21) Appl. No.: 10/000,328

(22) Filed: Dec. 4, 2001

(65) Prior Publication Data

US 2002/0086196 A1 Jul. 4, 2002

(30) Foreign Application Priority Data

Dec. 5, 2000 (JP) ........................................ 2000-370219

(51) Int. Cl.[7] ................................................ H01M 2/02
(52) U.S. Cl. ............................. 429/34; 429/38; 429/39
(58) Field of Search ............................. 429/34, 38, 39

(56) References Cited

U.S. PATENT DOCUMENTS 5,468,573 A * 11/1995 Bregoli et al. ................ 429/16
6,358,642 B1 * 3/2002 Griffith et al. ................ 429/34

FOREIGN PATENT DOCUMENTS

| JP | 09-298064 | 11/1997 |
| JP | 2000-251902 | 9/2000 |
| JP | 2000-317531 | * 11/2000 |
| JP | 2000-229932 | 8/2001 |

OTHER PUBLICATIONS

Abstract, JP 10–241709, Sep. 11, 1998, Matsukawa Masanori et al.

* cited by examiner

Primary Examiner—M. Kornakov
(74) Attorney, Agent, or Firm—Sughrue Mion, PLLC

(57) ABSTRACT

A fuel-cell-use separator is provided with a current collector unit having an irregular shape in its cross-section in which grooved gas passages and/or cooling medium passages and protruding portions contacting a membrane electrode assembly are alternately formed continuously, and a circumferential portion formed on the periphery of the current collector unit, the current collector unit and the circumferential portion being formed by press forming a sheet of metal plate, and in this arrangement, a rib is formed on the circumferential portion.

3 Claims, 4 Drawing Sheets

With a rib
(width:0.8mm, depth:0.1mm,
amount of warp:0.56mm)

With a rib
(width:1mm, depth:0.1mm,
amount of warp:0.07mm)

With a rib
(width:10mm, depth:0.1mm,
amount of warp:0.09mm)

Without a rib
(amount of warp:4.68mm)

SEPARATOR FOR FUEL CELL AND FUEL CELL

BACKGROUND OF THE INVENTION

1. Technical Field

The present invention relates to separators constituting a polymer electrolyte fuel cell and relates to a fuel cell using such separators.

2. Related Art

In a polymer electrolyte fuel cell, a separator is layered on both sides of a plate-shaped membrane electrode assembly to form a unit of the layered structure, and a plurality of the units are layered to form a fuel cell stack. The membrane electrode assembly has a three-layered structure, in which an electrolytic membrane made from a resin such as ion-exchange resin is interpolated between a pair of gas diffusion electrode plates (positive electrode plate and negative electrode plate). The separator is stacked in a manner so as to contact the gas diffusion electrode plates of the membrane electrode assembly with gas passages for flowing a gas and cooling medium passages being formed between it and the gas diffusion electrode plate. According to this fuel cell, for example, hydrogen gas as a fuel is supplied to the gas passages facing the gas diffusion electrode plate at the negative electrode side, and an oxidizing gas such as oxygen or air is supplied to the gas passages facing the gas diffusion electrode plate at the positive electrode side, whereby electricity is generated by electrochemical reaction.

The above-mentioned separator must have functions for supplying electrons generated through the catalyst reaction of the gas (hydrogen gas) on the negative electrode side to an external circuit, and also for supplying electrons from the external circuit to the positive electrode side. Therefore, a conductive material made from a graphite-based material or a metal-based material is used as the separator, and in particular, those made from a metal-based material are considered to be advantageous since they are superior in mechanical strength and since they are formed into a thin-plate so as to make them light and compact. The separator made from a metal is generally formed by press forming a thin plate made of a metal material having a high anti-corrosion property, such as stainless steel and titanium alloy, into a plate having an irregular shape in its cross-section, and those having a surface with a plated noble metal such as gold and platinum are also used. The separator made from metal of this type has been proposed in Japanese Patent Application Laid-Open No. 10-241709.

In the separator made of metal, the portion formed into the shape having the irregular shape in its cross-section forms a current collector unit in which grooved gas passages and cooling medium passages and protruding portions contacting the gas diffusion electrode plates of the membrane electrode assembly are alternately formed continuously. Here, in the case when this current collector unit is formed through the press forming, the metal plate is subjected to bending and extending. A stress resulting from the press forming tends to occur inside thereof, resulting in a warp in the separator after the molding process. The separator having a warp causes problems in which the protruding portions are not allowed to contact the gas diffusion electrode plates with a sufficient surface pressure or in which the surface pressure becomes nonuniform, resulting in high contact resistance and a subsequent reduction in generated voltage. When the fuel cell stack is formed by stacking a plurality of the membrane electrode assemblies while interpolating the separators therebetween, the assembling process has to be carried out while correcting the warp; therefore, the operation is complicated and difficult, resulting in another problem of a reduction in gas sealing properties.

SUMMARY OF THE INVENTION

Therefore, an object of the present invention is to provide a separator for a fuel cell and a fuel cell in which a warp resulting from press forming is reduced so that it becomes possible to stabilize the power generating performance, to simplify the assembling process and also to improve gas sealing properties.

The present invention provides a separator for fuel cell separator for fuel cell, comprising: a current collector unit having an irregular shape in its cross-section in which grooved gas passages and/or cooling medium passages and protruding portions contacting a membrane electrode assembly are alternately formed continuously; and a circumferential portion formed on the periphery of the current collector unit, the current collector unit and the circumferential portion being formed by press forming a sheet of metal plate, wherein a rib is formed on the circumferential portion. The rib in the invention is a linear protrusion in which a surface thereof projects from a surface of the circumferential portion and another surface forms a groove.

According to the invention, the rib formed on the circumferential portion makes it possible to increase the rigidity of the circumferential portion, and consequently to make the inner stress, which generates a warp, difficult to be transmitted, thereby preventing the generation of the warp. Therefore, the separator in the present invention has a flat shape as a whole, and when a fuel cell stack is formed by stacking a plurality of membrane electrode assemblies while interpolating the separator therebetween, the surface pressure of the protruding portions contacting the membrane electrode assemblies can be uniform and the contact resistance is reduced, thereby making it possible to stabilize the power generating performance. Moreover, during assembling the fuel cell, it is not necessary to correct the warp in the separator, whereby the assembling operation can be easy and gas sealing properties can be improved. Furthermore, since the rib is located between the current collector unit and the external unit, an air layer inside the rib can improve heat-insulating properties with respect to the external unit. Therefore, the temperature distribution in the current collector unit can be uniform, and the power generating performance can be stabilized.

The rib formed on the circumferential portion of the separator of the present invention is preferably formed in an endless shape along the entire circumference of the circumferential portion. According to this arrangement, it becomes possible to suppress the transmission of the inner stress in any cross-sectional direction, and to prevent a problem in which an area without the rib tends to be warped. In this case, the number of the ribs is at least one, and a plurality of them may be formed, if necessary.

The above-mentioned rib in accordance with the present invention must have optimal width and depth (height) in accordance with the dimension and shape of the separator. For example, in the case of a separator having a square shape as a whole with approximately 100 mm in the length on one side, the width of the rib is preferably not less than 1 mm. Moreover, in the case of 1000 mm in the length on one side, the width of the rib is preferably set to not less than 3 mm, and in the case of 2000 mm in the length on one side, the width of the rib is preferably not less than 4 mm. Moreover, the rib may be formed in the middle portion in the width direction in the circumferential portion, or may be formed on the outer-most end.

The rib may be formed simultaneously with the current collector unit at the time of press forming the separator. The rib may be formed after forming the current collector unit, or may be preliminarily formed prior to forming the current collector unit. From the viewpoint of the simplified manufacturing process, the simultaneous formation is more preferable.

DESCRIPTION OF THE PREFERRED EMBODIMENTS

Referring to attached drawings, an explanation will be given to one preferred embodiment of the present invention.

Figure 1:
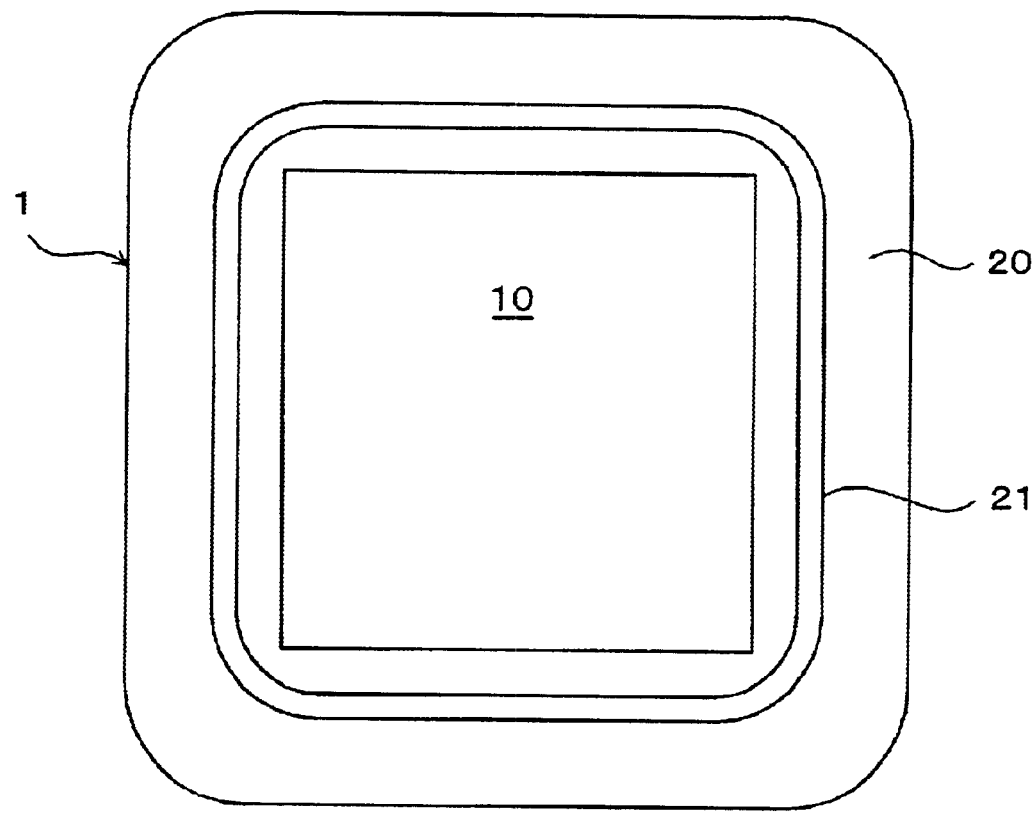
FIG. 1 is a plan view that shows a separator in accordance with one embodiment in accordance with the present invention.
Figure 2:
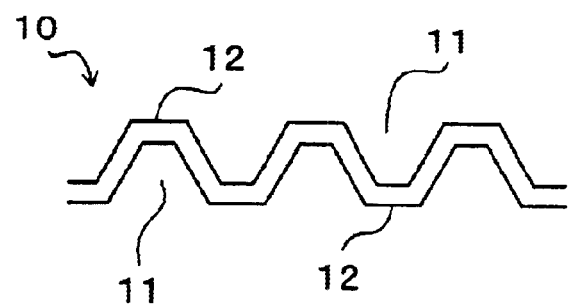
FIG. 2 is a cross-sectional view showing a current collector unit of the separator.

FIG. 1 is a plan view showing a separator 1 having a square shape in accordance with one preferred embodiment. This separator 1 is formed by press forming a sheet of thin plate made of stainless steel, etc. with a current collector unit 10 having a square shape formed in the center thereof, and a circumferential portion 20 is formed around the periphery of this current collector unit 10. As illustrated in FIG. 2, the current collector unit 10 is formed as a corrugated plate in which trapezoidal protrusions and recesses in the profile of the cross section are continuously formed in the surface direction. Grooves formed on both surfaces are employed as gas passages 11, and protruding edge surfaces of the protruding portions 12 between the grooves 11 are contacted with gas diffusion electrode plates of membrane electrode assemblies which form a fuel cell.

Figure 3:
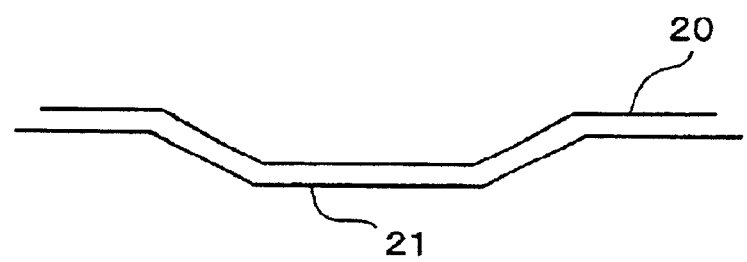
FIG. 3 is a cross-sectional view showing a rib formed on a circumferential portion of the separator.

A rib 21 is formed in a square shape at a position near the current collector unit 10 around the center of the circumferential portion 20 along the entire circumference of the circumferential portion 20. The rib 21 is formed simultaneously with the current collector unit 10 by the press forming process, and as illustrated in FIG. 3, the profile of the cross-section has a trapezoidal shape with the depth being equal to the thickness of the separator 1. Moreover, each of the four corners of the rib 21 is curved with a semi-circular arch along each edge of the four corners.

Figure 4:
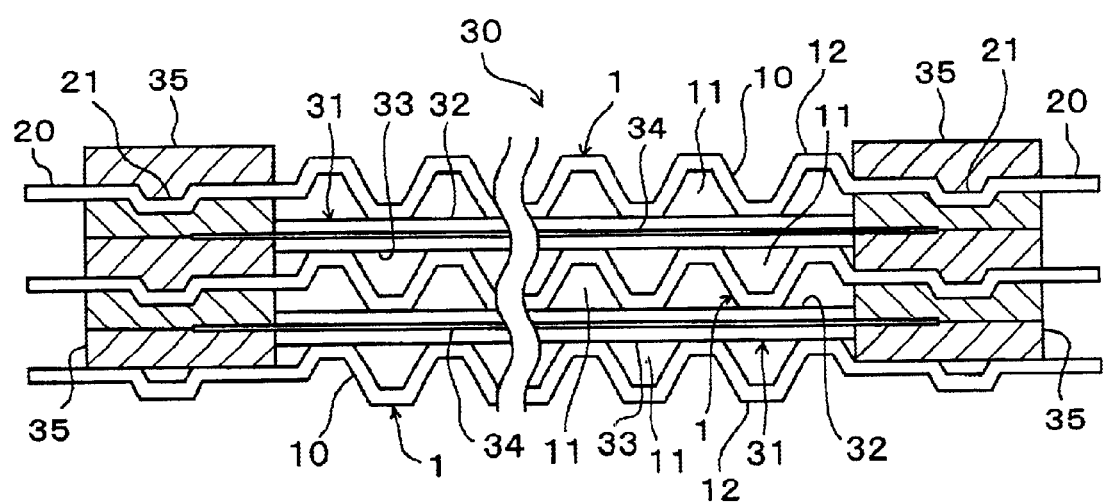
FIG. 4 is a cross-sectional view that shows a structure of a fuel cell stack in accordance with one embodiment of the present invention.
Figure 5A:
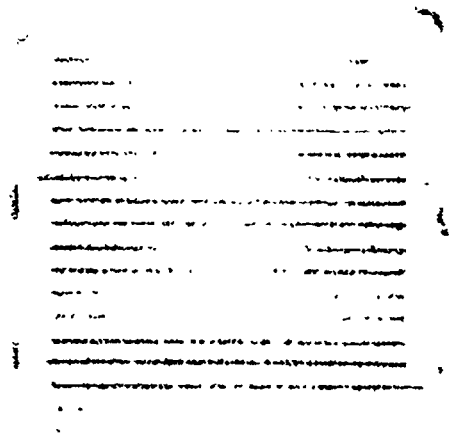
FIGS. 5A to 5C are drawings that show surface pressure states of the separator in examples of the present invention.
Figure 5B:
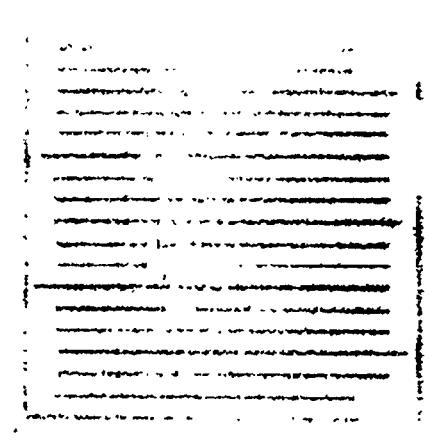
Figure 5C:
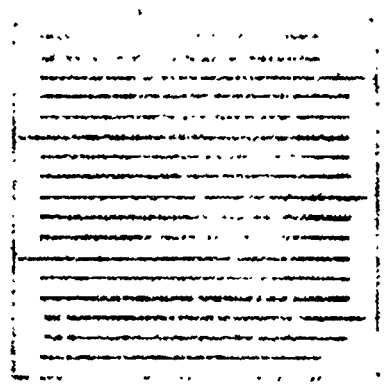
Figure 5D:
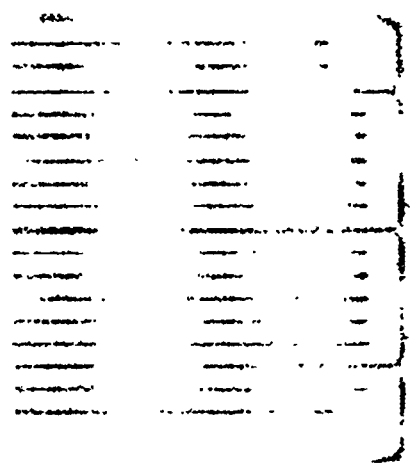
FIG. 5D is a drawing that shows a surface pressure state of a separator of a comparative example.

The above separator 1 is sandwiched between a plurality of membrane electrode assemblies that are stacked; thus, a fuel cell stack is formed. FIG. 4 shows an example of such a fuel cell stack 30 has a multi-layered structure in which plural layers of units of fuel cells, each unit being formed by providing the separators 1 on both sides of a membrane electrode assembly 31, are stacked, and the multi-layered structure is held by being sandwiched by end plates (not shown), with a predetermined assembling pressure.

Each membrane electrode assembly 31 has a three-layered structure in which an electrolyte membrane 34 is sandwiched between a pair of gas diffusion electrode plates (a positive electrode plate 32 and a negative electrode plate 33), and forms a flat regular square shape. The electrolyte membrane 34 in the center of the membrane electrode assembly 31 has an area larger than a positive electrode plate 32 and a negative electrode plate 33 that mutually have the same dimension, and has a circumferential portion having a uniform width being exposed therefrom. A frame-shaped seal 35 made from rubber, resin or the like is interpolated between the circumferential portion and the separator 1, in a manner so as to surround the positive electrode plate 32 and the negative electrode plate 33. The seal 35 has an appropriate elasticity, and covers the rib 21 formed on the circumferential portion 20 of the separator 1. In a state in which the fuel cell stack 30 is formed in this manner, the protruding surface of each protruding portion 12 of the current collector unit 10 of the separator 1 is contacted with the positive electrode plate 32 or the negative electrode plate 33 so that a gas passage 11 is formed by the inner face of each protruding portion 12 and the positive electrode plate 32 or the negative electrode plate 33.

In accordance with the present preferred embodiment, the rib 21 is formed on the circumferential portion 20 of the separator 1, so that the rigidity of the circumferential portion 20 is greatly increased in comparison with a flat structure, thereby reducing the generation of a warp after the press forming. Therefore, in the fuel cell stack 30 formed by stacking a plurality of the membrane electrode assemblies 31 with these separators 1 being interpolated therebetween, the surface pressure of each protruding portion 12 contacted with the membrane electrode assembly 31 can be uniform, whereby the contact resistance can be reduced and the power generating performance can be stabilized at a high level. Moreover, during assembling the fuel cell stack 30, it is not necessary to correct the warp in the separator 1, whereby the assembling operation can be easy and gas sealing properties can be improved. Furthermore, since an air layer inside the rib 21 can improve heat-insulating properties with respect to the external unit, the temperature distribution in the current collector unit 10 can be uniform, and the power generating performance can be stabilized. In particular, in the embodiment, since the rib 21 is formed in an endless shape without intermittent along the entire circumference of the circumferential portion 20, it is possible to suppress the inner stress from transmitting in any cross-sectional direction, and consequently to exert the above-mentioned effects sufficiently.

EXAMPLES

Next, an explanation will be given of examples of the present invention.

(1) Preparation of a Separator

Separators of examples with varied combinations of the width and depth of the rib as shown in Table 1 were obtained by press forming thin plates made of stainless steel in a regular square shape having 86 mm in one side and 0.2 mm in thickness. These separators were formed in the same manner as shown in FIG. 1, and the current collector unit had 60 mm in one side, 1.5 mm in the width of the gas passage and 1.0 mm in the depth of the gas passage, and a rib was formed on a portion extending 2.0 mm from the edge of the current collector unit in a regular square shape along the entire circumference of the circumferential portion. Moreover, a separator was also formed in the same manner as examples except that no rib was formed, as a comparative example.

TABLE 1

Amount of warp in separators (unit mm)

| Width of rib (mm) | Depth of rib (mm) | | | | |
|---|---|---|---|---|---|
| | 0.1 | 0.2 | 0.3 | 0.4 | 0.5 |
| 0.5 | 0.98 | 0.96 | 0.95 | 0.93 | 0.91 |
| 0.8 | 0.56 | 0.52 | 0.49 | 0.46 | 0.42 |
| 1 | 0.07 | 0.06 | 0.06 | 0.06 | 0.05 |
| 2 | 0.07 | 0.06 | 0.05 | 0.05 | 0.05 |
| 3 | 0.07 | 0.06 | 0.05 | 0.04 | 0.04 |
| 4 | 0.08 | 0.06 | 0.05 | 0.04 | 0.04 |
| 5 | 0.08 | 0.07 | 0.06 | 0.05 | 0.04 |
| 6 | 0.08 | 0.07 | 0.06 | 0.05 | 0.05 |
| 7 | 0.08 | 0.07 | 0.07 | 0.06 | 0.06 |
| 8 | 0.09 | 0.07 | 0.07 | 0.06 | 0.06 |
| 9 | 0.09 | 0.08 | 0.08 | 0.07 | 0.06 |
| 10 | 0.09 | 0.08 | 0.08 | 0.07 | 0.07 |
| Without rib | | | 4.68 | | |

(2) Measurements of Amount of Warp

Each separator thus prepared was placed on a flat plate, and the vertical distance from the farthest portion from the flat plate and the flat plate was measured by using a laser displacement gauge, and the value obtained by subtracting the thickness of the separator from the measured value was set as an amount of warp. Table 1 shows the results of measurements. As shown in Table 1, the amount of warp of the separator without the rib was 4.68 mm, and in comparison with this value, the amount of warp in the separators with the ribs was reduced to a great degree. In particular, when the width of the rib was not less than 1 mm, the amount of warp was reduced to less than 0.1 mm. Moreover, with respect to the depth of the rib, the amount of warp was slightly reduced as the depth increased; and it demonstrated that the depth of 0.1 mm makes it possible to suppress the warp. Therefore, with respect to the rib which can suppress the warp in the separator, it is effective to set it to have a width of not less than 1 mm and a depth of not less than 0.1 mm.

(3) Observation of Contact Surface Pressure

Separators having respective different ribs with widths of 0.8 mm, 1 mm and 10 mm with a common depth of 0.1 mm and a separator without a rib were respectively placed on sheets of pressure-sensitive paper, and pressed onto the pressure-sensitive paper with a surface pressure of 5 kg/cm$^2$ when converted to the entire projection area; thus, the press contact state of the protruding portion of the current collector unit to the pressure-sensitive paper was observed. FIGS. 5A to 5D show the respective press contact states of the protruding portions of the separators. In accordance with these Figures, the separator having the rib formed therein had a dispersed contact surface pressure as compared with the separator without the rib. Moreover, in the separators with the rib widths of 1 mm and 10 mm, the contact surface pressure was applied thereon virtually in an even manner; thus, it demonstrated that the width of the rib of not less than 1 mm makes it possible to effectively suppress the warp.

(4) Measurements on Generated Voltage

Figure 6:
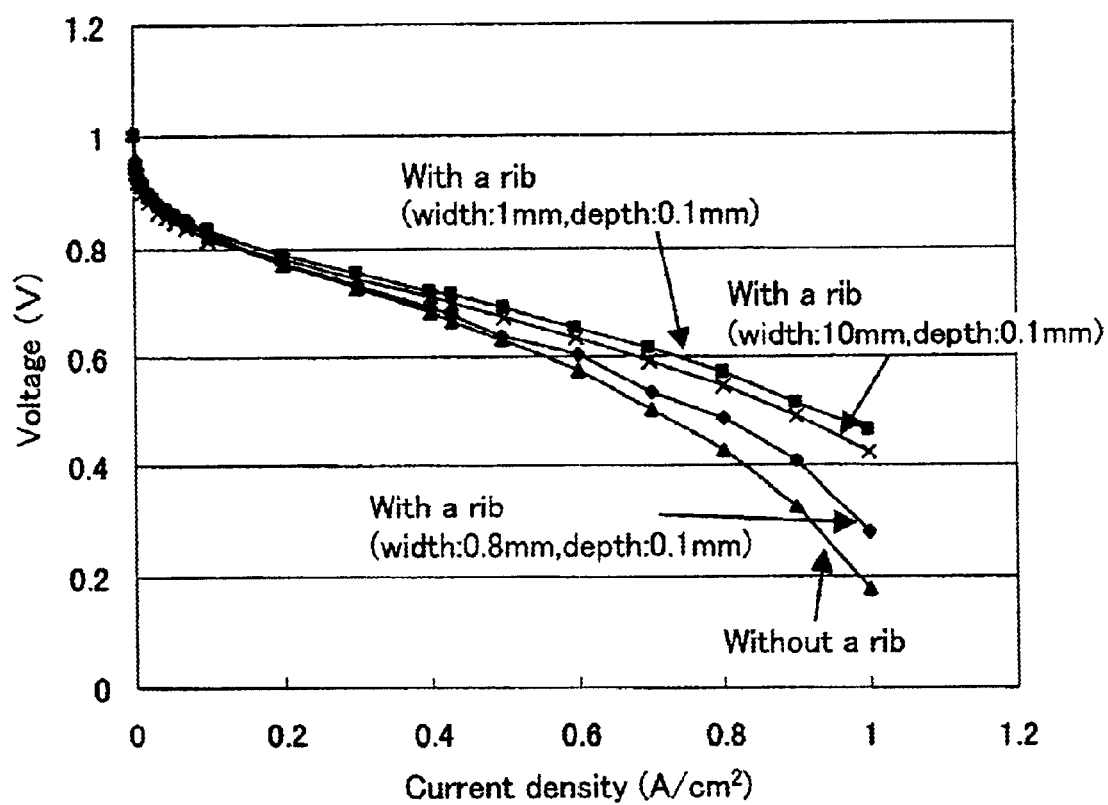
FIG. 6 is a graph that shows the relationship between the presence or absence of a rib and the generated voltage.

Next, a plurality of separators having a rib width of 0.8 mm and a depth of 0.1 mm were used to form fuel cell stacks of 10 units provided with 10 membrane electrode assemblies. Moreover, in the same manner, a fuel cell stack constituted by a separator having a rib width of 1 mm and a depth of 0.1 mm, a separator having a rib width of 10 mm and a depth of 0.1 mm and a separator without a rib was prepared. With respect to these fuel cell stacks, hydrogen gas as a fuel was flown through the gas passage facing the gas dispersion electrode plate on the negative electrode side, during air being is flown through the gas passage facing the gas dispersion electrode plate on the positive electrode side, so as to generate electricity. Thus, the generated voltage per unit at the time of a current density of 0 to 1 A/cm$^2$ was measured. The measuring conditions were: a gas flow rate of 100 kPa on both of the electrodes; a rate of utilization of 50%; a relative humidity of 50% and a temperature of 85 C. The results of measurements are shown in FIG. 6. In accordance with this Figure, it is confirmed that any of the separators with the rib formed therein has a higher voltage than the separator without the rib, thereby having a higher power generating performance. This is presumably because the surface pressure of the protruding portion of the collector unit contacted with the gas diffusion electrode plate is uniform and sufficient with a small contact resistance.

What is claimed is:

1. A separator for a fuel cell, comprising:

a current collector unit having an irregular shape in its cross-section in which grooved gas passages and/or cooling medium passages and protruding portions contacting a membrane electrode assembly are alternately formed continuously; and a circumferential portion formed on the periphery of the current collector unit, the current collector unit and the circumferential portion being formed by press forming a sheet of metal plate, wherein a rib is formed on the circumferential portion.

2. A separator for fuel cell according to claim 1, wherein the rib is formed along the entire circumference of the circumferential portion in an endless shape.

3. A fuel cell comprising:

a membrane electrode assembly formed by interpolating an electrolyte membrane between a pair of electrodes; and separators layered on both sides of the membrane electrode assembly to form a gas passage between it and each electrode of the pair of electrodes, wherein a separator recited in claim 1 is used as the separator.

* * * * *